(12) United States Patent
Alderson et al.

(10) Patent No.: US 7,989,057 B2
(45) Date of Patent: Aug. 2, 2011

(54) COMPOSITE MATERIAL

(75) Inventors: Andrew Alderson, Liverpool (GB); Kim Lesley Alderson, Liverpool (GB); Graham David Hudson, Cheshire (GB); David Edward Skertchly, Hampshire (GB)

(73) Assignee: Auxetic Technologies Limited, Bolton (GB)

( * ) Notice: Subject to any disclaimer, the term of this patent is extended or adjusted under 35 U.S.C. 154(b) by 0 days.

(21) Appl. No.: 12/300,229

(22) PCT Filed: May 24, 2007

(86) PCT No.: PCT/GB2007/001946
§ 371 (c)(1),
(2), (4) Date: Dec. 6, 2010

(87) PCT Pub. No.: WO2007/135447
PCT Pub. Date: Nov. 29, 2007

(65) Prior Publication Data
US 2011/0064909 A1  Mar. 17, 2011

(30) Foreign Application Priority Data
May 24, 2006 (GB) .................................. 0610272.7

(51) Int. Cl.
*D04H 1/00* (2006.01)
(52) U.S. Cl. .................. 428/292.1; 428/299.1; 264/125
(58) Field of Classification Search ............... 428/292.1, 428/299.7, 212; 264/125
See application file for complete search history.

(56) References Cited

U.S. PATENT DOCUMENTS

| | | | | |
|---|---|---|---|---|
| 4,668,557 A | * | 5/1987 | Lakes | 428/131 |
| 5,334,903 A | * | 8/1994 | Smith | 310/358 |
| 6,447,871 B1 | * | 9/2002 | Hawkins | 428/67 |
| 6,878,320 B1 | | 4/2005 | Alderson et al. | |
| 7,247,265 B2 | * | 7/2007 | Alderson et al. | 264/125 |
| 7,252,870 B2 | * | 8/2007 | Anderson et al. | 428/152 |
| 7,824,763 B2 | * | 11/2010 | Namburi et al. | 428/212 |
| 2005/0015906 A1 | * | 1/2005 | Baglieri | 15/167.1 |
| 2007/0031667 A1 | * | 2/2007 | Hook et al. | 428/373 |
| 2007/0286987 A1 | * | 12/2007 | Anderson et al. | 428/152 |
| 2008/0023372 A1 | * | 1/2008 | Leonard et al. | 208/113 |
| 2009/0239049 A1 | * | 9/2009 | Hook et al. | 428/212 |
| 2011/0064909 A1 | * | 3/2011 | Alderson et al. | 428/114 |

FOREIGN PATENT DOCUMENTS
WO   00/53830   9/2000
WO   2007/052054   5/2007

OTHER PUBLICATIONS

V.R. Simkins et al., An Experimental Study of Thermal Post-Production Processing of Auxetic Polypropylene Fibres, Phys. Stat. Sol. B, 245 (3) (2008) 589.
A. Alderson et al., Auxetic Materials, Proc. Inst. Mech. Eng., Part G, J. Aero. Eng., 221 (2007) 565.
K. Alderson et al., Auxetic Materials, Material Inspirations, No. 3 (2007) 12.

(Continued)

*Primary Examiner* — N. Edwards
(74) *Attorney, Agent, or Firm* — Greenberg Traurig, LLP

(57) ABSTRACT

A composite material comprises a layer of fibres conjoined to a matrix, where one of the matrix and fibres comprises a first component which exhibits auxetic behaviour for loading along a first direction, and the other of the matrix and fibres comprises a second component which exhibits non-auxetic behaviour for loading along the first direction.

21 Claims, 11 Drawing Sheets

OTHER PUBLICATIONS

A. Alderson et al., Auxetic Composites Expand When They Are Stretched, JEC Composites Magazine, 43(28) (2006) 65.

J.N. Grima et al., An Alternative Explanation for the Negative Poisson's Ratios in α-Cristobalite Materials Science and Engineering A, 423(1-2) (2006) 219.

N. Ravirala et al., Negative Poisson's Ratio Polyester Fibres Textile Research Journal, 76(7) (2006) 540.

J.N. Grima et al., On the Suitability of Empirical Models to Simulate the Mechanical Properties of α-cristobalite Xjenza, 10 (2005) 24.

A. Alderson et al., The Effects of Processing on the Topology and Mechanical Properties of Negative Poisson's Ratio Foams, American Society of Mechanical Engineers, Aerospace Division (Publication) AD, v70 AD, Proceedings of the ASME Aerospace Division 2005 503.

J.N. Grima et al., Auxetic Cellular Materials and Structures, American Society of Mechanical Engineers, Aerospace Division (Publication) AD, v70 AD, Proceedings of the ASME Aerospace Division 2005 489.

A. Alderson et al., Expanding Materials and Applications: Exploiting Auxetic Textiles, Technical Textiles International, 14(6) (2005) 29.

V.R. Simkins et al., Single Fibre Pullout Tests on Auxetic Polymeric Fibres, J. Mat. Sci. 40(16) (2005)4355.

N. Ravirala et al., Auxetic Polypropylene Films, Polymer Engineering and Science 45(4) (2005) 517.

N. Ravirala et al., Expanding the Range of Auxetic Polymeric Products Using a Novel Melt-Spinning Route, Phys. Stat. Sol. B 242(3) (2005) 653.

K.L. Alderson et al., How to Make Auxetic Fibre Reinforced Composites, Phys. Stat. Sol. B 242(3) (2005) 509.

A. Alderson et al., Modelling the Deformation Mechanisms. Structure-Property Relationships and Applications of Auxetic Nanomaterials, Phys. Stat. Sol. B 242(3) (2005) 499.

A. Alderson et al., Modelling of Negative Poisson's Ratio Nanomaterials: Deformation Mechanisms. Structure-Property Relationships and Applications, Journal of Metastable and Nanocrystalline Materials (2005) 55.

A. Alderson et al., Molecular Modelling of the Deformation Mechanisms Acting in Auxetic Silica, Computational Methods in Science and Technology 10(2) (2004) 117.

V.R.Simkins et al., Auxetic Fibres Anchoring Composite Materials, Proceedings of Launch Event for the UK Auxetic Materials Network (Sheffield UK, Apr. 22, 2004) and the First Auxetics Young Researchers Forum (The University of Bolton, UK, Apr. 23, 2004) 28. ISBN: 99909-53-02-1.

N. Ravirala et al., Auxetic Polyamide Fibres, Proceedings of Launch Event for the UK Auxetic Materials Network (Sheffield UK, Apr. 22, 2004) and the First Auxetics Young Researchers Forum (The University of Bolton, UK, Apr. 23, 2004) 25. ISBN: 99909-53-02-1.

K.L. Alderson et al., Auxetic Polymeric Extruded Products, Proceedings of the 2nd International Conference on Materials for Advanced Technologies (ICMAT 2003)—Symposium I (Advanced Polymers), Singapore, Dec. 2003.

A. Alderson et al., Auxetic Polymers for Thermal Applications: A Hot Topic?, Proceedings of the 12th International Conference on Deformation Yield and Fracture of Polymers, Cambridge, UK, 2003. IOM Communications Ltd. (2003) 337.

N. Ravirala et al., Auxetic Extruded Products, Proceedings of the 12th International Conference on Deformation, Yield and Fracture of Polymers, Cambridge, UK, 2003. IOM Communications Ltd. (2003) 333.

K.L. Alderson et al., Auxetic Polypropylene Fibres. Part 1. Manufacture and Characterisation, Plastics, Rubber and Composites 31(8) (2002) 344.

P.J. Stott et al., Auxetic Materials—Applications, http://www.azomcomjDetaj Is.asp?ArticleID=168 Jan. 2002.

P.J.Stott et al., Auxetic Materials—An Introduction, http//www.azom.com/Details.asp?AnticleID=167 Jan. 2002.

A. Alderson, Counter-intuitive Behaviour, Future Materials Mar.-Apr. 2002 7.

V.R. Simkins et al., The Positive Side of Negativity . . . Auxetic Filaments, Their Novel Characteristics and Potential End Uses, Proceedings of the 2nd AUTEX Conference, Bruges, Belgium, Jul. 2002 403.

A.Alderson et al., Rotation and Dilation Deformation Mechanisms for Auxetic Behaviour in the α-cristobalite Tetrahedral Framework Structure, Phys. Chem. Minerals 28(2001)711.

J.P.M. Whitty et al., Towards the Desirn of Sandwich Panel Composites with Enhanced Mechanical and Thermal Properties by Variation of the In-plane Poisson's ratios, ICMAC—International Conference for Manufacturing of Advanced Composites. JOM Communications Ltd. (2001) 280.

V.R. Simkins et al., Accentuate the Negative—The Potential for the Use of Auxetic Fibres in High Performance Textiles, World Congress 2001—High Performance Textiles: Increased Competitiveness through Innovation and Technology.

K.L. Alderson et al., The Fabrication and Testing of Auxetic Polyolefin Fibres, Polymer '01—The New Polymers: Design, Development & Applications (2001)49.

K.E. Evans et al., Auxetic Materials: Functional Materials and Structures from Lateral Thinking! Adv. Mater. 12(9) (2000) 617. (Invited Review Paper).

J.N. Grima et al., Do Zeolites have Negative Poisson's Ratios? Adv. Mater. 12(24) (2000)1912.

J.N. Grima et al., Zeolites with Negative Poisson's Ratios, Proceedings of the 220th ACS National Meeting (Inorganic Division), Washington DC, Aug. 2000.

A. Alderson et al., Finite Element Modelling of the Deformation of Auxetic and Non-Auxetic Cellular Polymers in Pristine and Defect Forms, Proceedings of the 11th International Conference on Deformation, Yield and Fracture of Polymers, Cambridge, UK, 2000. Inst. Mails. (2000) 343.

A. Alderson, A Triumph of Lateral Thought, Chem. Ind. (1999) 384. (Invited Review Paper).

K.L. Alderson et al., Evidence for Uniaxial Drawing in the Fibrillated Microstructure of Auxetic Microporous Polymers. J. Mat. Sci. Lett. 17 (1998)1415.

A. Alderson et al., Modelling Concurrent Deformation Mechanisms in Auxetic Microporous Polymers, J. Mat. Sci. 32 (1997) 2797.

K.L. Alderson et al., The Interpretation of the Strain-dependent Poissons Ratio in Auxetic Polyethylene, J. Strain Analysis 32(3) (1997)201.

A.Alderson et al., Analytical Modelling of the Deformation of Auxetic Polymers, Proceedings of the 10th International Conference on Deformation, Yield and Fracture of Polymers, Cambridge, UK, 1997. Inst. Malls. (1997) 482.

A. Alderson et al., Modelling Auxetic Behaviour in Tetrahedral Framework Structures: Why is α-cristobalite Auxetic whereas α-quartz is not? Physics Research for Britain '97, Rutherford Appleton Laboratory, Didcot, UK, 1997. Programme and Abstract Book (1997) No. 1.

A.Alderson et al., Microstructural Modelling of Auxetic Microporous Polymers, J. Mat. Sci. 30 (1995) 3319.

Evans KR et al., The static and dynamic moduli of auxetic microporous polyethylene, J. Mat. Sci. Lett. 11(24) (1992) p. 1721-1724.

Alderson KL et al., Strain dependent behaviour of microporous polyethylene with a negative Poisson's ratio, J. Mat. Sci. 28 (1993) p. 4092-4098.

Neale PJ et al., Negative Poisson's ratio of microporous polyethylene in compression, J. Mat. Sci.Lett. 12 (1993) p. 1529-1532.

Alderson KL, Auxetic polyethylene: the effect of a negative Poisson's ratio on hardness, Acta Met. Et Mat. 42(7) (1994) p. 2261-2266.

Pickles AP et al., The effect of the processing parameters on the fabrication of auxetic polyethylene. 1. The effect of compaction conditions, J. Mat. Sci. 30 (1995) p. 4059-4068.

Webber RS et al., Novel variations in the microstructure of the auxetic microporous ultra high molecular weight polyethylene. Part 1. Processing and microstructure, Polym. Eng. and Sci. 4(8) (2000) p. 1894-1905.

Alderson KL et all, Novel variations in the microstructure of the auxetic microporous ultra high molecular weight polyethylene. Part 2. Mechanical properties, Polym. Eng. and Sci. 4(8) (2000) p. 1906-1914.

Alderson KL et al., Auxetic polyethylene: the effect of a negative Poisson's ratio on hardness, Acta Met. Et Mat. 42(7) (1994) p. 2261-2266.

Evans KE, et al., The Design, Matching and Manufacture of auxetic carbon fibre composites J. Comp. Mat., 38(2) (2004) p. 95-106.

Ravirala N. et al., Interlocking hexagons model for auxetic behaviour J. Mat. Sci., 42 (2007) p. 7433-7445.

\* cited by examiner

COMPOSITE MATERIAL

The present invention relates to a composite material and a method for its production.

A composite material is traditionally considered to be a material system composed of a mixture or combination of two or more micro- or macro-constituents that differ in form and chemical composition and which are essentially insoluble in each other. Composites are important because they possess properties that are superior to the properties of their individual constituents. Composite systems may be polymeric, metallic or ceramic based systems, or some combination of these classes of materials. Recently, composites have been developed having high and low melt temperature constituents of the same polymer, and composites containing constituents at the nanoscale (so-called nanocomposites) have also been developed.

In polymeric composites, typically reinforcement materials include glass, carbon, aramid, boron, silicon carbide and aluminium oxide in a variety of forms including continuous fibres, short chopped fibres, textile fabric structures and spherical inclusions. Naturally-occurring polymer fibres such as hemp and cellulose are also used as reinforcement materials. Common polymeric matrix materials include thermosetting polymers such as unsaturated-polyester, epoxy resins, phenolic resins and polyimides, and thermoplastic polymers such as polypropylene, polyamide, polycarbonate, polyacetols, polyetheretherketone (PEEK), polyethylene terephtalate (PET), polyphenylene sulphide (PPS), polyethersulphone (PES) polyetherimide (PEI), and polybutylene terephthalate (PBT).

In ceramic composites, typically reinforcement materials include silicon carbide, silicon nitride, boron carbide, aluminium nitride, titanium diboride and boron nitride in a variety of forms including continuous monofilament and multifilament tow fibres, whiskers, platelets, and particulates. Common ceramic matrix materials include alumina, silica, mullite, barium aluminosilicate, lithium aluminosilicate, calcium aluminosilicate, silicon carbide, silicon nitride, boron carbide and aluminium nitride.

In metal matrix composites, typically reinforcement materials include tungsten, beryllium, titanium, molybdenum, boron, graphite (carbon), alumina, silicon carbide, boron carbide and alumina-silica in a variety of forms including continuous fibres, discontinuous fibres, whiskers, particulates and wires. Common metal matrix materials include aluminum, titanium, magnesium, iron and copper alloys and superalloys.

Composite materials are typically in the form of laminates, i.e. they are composed of a number of layers (laminae) each containing continuous lengths of unidirectional reinforcing fibres embedded within the matrix. Mechanical properties are optimised by the choice of stacking sequence and orientation for a specific application.

It is well known that the properties of advanced polymer composites materials which are cured during fabrication at elevated temperatures (typically 120 to 190° C.) are degraded by the residual stresses induced in the composite as the constituents, i.e. matrix and reinforcement, shrink at different rates during cooling to ambient temperatures (typically 20 to 30° C.).

It is also well known, that as an advanced composite heats up and cools down the internal stresses will cause the shape of the composite structures to distort.

In an attempt to reduce this distortion it is known to introduce additional layers of materials which are positioned off axis relative to the reinforcement. This process is known as balancing. However, this has the effect of producing laminates in which the mechanical properties may not be optimised, increases time and cost in the manufacturing stage and also increases the weight of the component.

An alternative approach has been to combine both positive and negative coefficient of thermal expansion (CTE) materials within the same composite in order to achieve on average the desired zero or low thermal expansion of the overall composite. Examples in this latter respect include negative axial CTE carbon fibres within a positive CTE cyanate ester matrix for use in casings for satellites to maintain size and shape from high temperature launch to lower temperature space conditions. A non-woven aramid material (negative CTE) is used to reinforce positive CTE thermoset resin (e.g. epoxy) to produce low or zero CTE substrates for use in printed circuit boards. Crystalline quartz particles (negative CTE) are used within vitreous quartz (positive CTE) to product low or zero CTE composite material for large telescope mirror substrates and laser gyroscopes in aircraft. Negative CTE zirconium tungstate packaging and supports are combined with positive CTE silica fibre to produce low or zero CTE fibre Bragg grating devices displaying constant reflected wavelength over a range of temperatures for use in optoelectronic systems.

However, combining negative and positive CTE materials does have a number of disadvantages; these include: a) limited use as there is a relative lack of negative CTE materials having the appropriate range of other physical properties for specific applications; b) in laminate systems there is a tendency to increase inter laminar shear; and c) the inevitable increase in weight and processing of the composite due to the addition of the negative CTE material. These considerations lead to increased cost of the final composite material.

Therefore, it is desirable to provide a composite material whose components comprise materials having different rates of expansion in order to minimise any distortion of the material which results from heating up and cooling down the material. Moreover, it is desirable that the component materials should have an appropriate range of physical properties in order that the composite materials can be widely used. It is also desirable to be able to match the composite material to its surrounding structures or to other composite materials in order to improve the performance of the joints (being either mechanical or bonded) between the various components of a composite material or structure of which a composite material forms part.

According to a first aspect of the present invention there is provided a composite material comprising a layer of fibres conjoined to a matrix, wherein one of the matrix and fibres comprises a first component which exhibits auxetic behaviour for loading along a first direction, and the other of the matrix and fibres comprises a second component which exhibits non-auxetic behaviour for loading along the first direction.

Auxetic behaviour is defined by a Poisson's ratio, measured in a particular direction with respect to the material, which is negative (less than zero). As a result, when the material is stretched in that direction by application of a tensile load, the material expands transversely to that direction. Correspondingly, when compressed in that direction, the material contracts transversely to that direction. Similarly, non-auxetic behaviour is defined by a Poisson's ratio which is positive (greater than zero).

It will be understood that the term "first direction" is that which the tensile load is applied, and therefore the direction for which the auxetic behaviour is defined by the Poisson's ratio.

It will be understood that the term "Young's modulus" is known in the art and is a measure of stiffness. It is defined as the ratio, for small strains, of the rate of change of stress with strain. If Young's modulus is the same in all directions for a material, the material is referred to as being isotropic. Materials in which Young's modulus changes depending on which direction the force is applied from are termed anisotropic. The SI unit of Young's modulus is pascal (Pa). or alternatively kN/mm$^2$, which gives the same numeric value as gigapascals.

It will be understood that the term "Coefficient of Thermal Expansion" is known in the art and refers to a change in a material's dimensions due to a change in temperature. It will be understood that materials having a positive expansion coefficient will expand when heated, and contract when cooled. Some substances have a negative expansion coefficient, and will expand when cooled (e.g. freezing water).

The layer of fibres may be embedded in the matrix, partially embedded in the matrix, or may form a separate layer in contact with the matrix.

The layer of fibres may have any suitable construction; for example, it may comprise bundles of unidirectional fibres, or a woven, knitted, or non-woven mesh. Preferably, the layer of fibres comprises unidirectional fibres or a woven, knitted or non-woven mesh. More, preferably, the layer of fibres comprises unidirectional fibres.

Where the layer of fibres comprises unidirectional fibres, preferably the first direction, along which loading is applied for the assessment of auxetic behaviour, is parallel to the direction of the fibres.

For the avoidance of doubt, either or both of the phases (fibre and matrix) of the composite material may comprise the first component, the second component, or both first and second components.

In a preferred embodiment, the layer of fibres comprises the first component and the matrix comprises the second component. Further preferably, the composite material comprises a layer of fibres, some of which exhibit auxetic behaviour for loading along a first direction and some of which exhibit non-auxetic behaviour for loading along the first direction, embedded in a matrix which exhibits non-auxetic behaviour for loading along the first direction.

In a preferred embodiment, the coefficients of thermal expansion of the composite, measured parallel and perpendicular to the first direction, are substantially equal.

In order to control the relationship between the longitudinal (i.e. measured parallel to the first direction) and transverse (i.e. measured perpendicular to the first direction) coefficients of thermal expansion of the composite, it is necessary to select the materials of the composite having certain values of coefficient of thermal expansion, Poisson's ratio, and Young's modulus, and to control the volume fraction of the composite occupied by each material.

In an alternative embodiment, the fibres comprise the second component, and the matrix comprises the first component.

Preferably, the coefficient of thermal expansion of the second component is lower than that of the first component, both measured in a direction parallel to the first direction. Preferably, the coefficient of thermal expansion of the second component, measured in a direction parallel to the first direction, is less than $1 \times 10^{-5}$ K$^{-1}$. Preferably, the coefficient of thermal expansion of the first component, measured in a direction parallel to the first direction, is greater than $5.4 \times 10^{-5}$ K$^{-1}$.

Preferably, the volume fraction of the second component is between 60 and 70%, and more preferably is 62%. Preferably, the volume fraction of the first component is less than 40%, more preferably between 15 and 25%, and most preferably is 19%.

Preferably, the composite additionally comprises a matrix material which exhibits non-auxetic behaviour for loading along the first direction. Preferably, the volume fraction of the non-auxetic matrix component is less than 40%, more preferably between 15 and 25%, and most preferably is 19%.

The volume fraction of the first component and the matrix material may be preferably 38% in total in the embodiment where the matrix material and the first component are constituents of the matrix phase.

For example, in one embodiment the composite comprises:
a non-auxetic unidirectional fibrous component having a volume fraction of 0.62, an axial Poisson's ratio of +0.2, a transverse Poisson's ratio of +0.28, an axial Young's modulus of 230 GPa, a transverse Young's modulus of 3 GPa, an axial coefficient of thermal expansion of $-6 \times 10^{-7}$K$^{-1}$, and a transverse coefficient of thermal expansion of $7 \times 10^{-6}$K$^{-1}$, a non-auxetic matrix component having a volume fraction of 0.19, an isotropic Poisson's ratio of +0.38, an isotropic Young's modulus of 3 GPa, an isotropic coefficient of thermal expansion of $5.4 \times 10^{-5}$K$^{-1}$; and an auxetic matrix component having a volume fraction of 0.19, an isotropic Poisson's ratio of −2, an isotropic Young's modulus of 3 GPa, an isotropic coefficient of thermal expansion of $9.61 \times 10^{-5}$K$^{-1}$;

said composite having zero coefficient of thermal expansion, both parallel and perpendicular to the direction of the fibres.

In an alternative embodiment, the volume fraction of the second component is between 60 and 70%, and more preferably is 62%. The volume fraction of the first component may preferably be less than 40%, more preferably less than 10%, and most preferably is 3.5%.

Preferably, the composite additionally comprises a matrix material which exhibits non-auxetic behaviour for loading along the first direction. The volume fraction of the non-auxetic matrix component is between 40% and 30%, and most preferably is 34.5%.

The volume fraction of the first component and the matrix material may be preferably 38% in total in the embodiment where the matrix material and the first component are constituents of the matrix phase.

For example, in the alternate embodiment, the composite comprises
a non-auxetic unidirectional fibrous component having a volume fraction of 0.62, an axial Poisson's ratio of +0.2, a transverse Poisson's ratio of +0.28, an axial Young's modulus of 230 GPa, a transverse Young's modulus of 3 GPa, an axial coefficient of thermal expansion of $-6 \times 10^{-7}$K$^{-1}$, and a transverse coefficient of thermal expansion of $7 \times 10^{-6}$K$^{-1}$;

a non-auxetic matrix component having a volume fraction of 0.3455, an isotropic Poisson's ratio of +0.38, an isotropic Young's modulus of 3 GPa, an isotropic coefficient of thermal expansion of $5.4 \times 10^{-5}$ K$^{-1}$; and an auxetic matrix component having a volume fraction of 0.0345, an isotropic Poisson's ratio of −4, an isotropic Young's modulus of 3 GPa, an isotropic coefficient of thermal expansion of $2.86 \times 10^{4}$K$^{-1}$;

said composite having zero coefficient of thermal expansion, both parallel and perpendicular to the direction of the fibres.

The auxetic material may therefore be used to control the thermal expansivity of a composite material, Without wishing to be bound by theory, it is believed that, during cure of the composite material of the second aspect of present invention, the first and second components become linked within the composite. The strain induced in the auxetic material (the first component) as the composite material changes temperature, including changes in temperature arising during processing, causes the auxetic component to expand and contract transverse to the first direction, in opposition to the contraction and expansion of the non-auxetic materials (including the second component) in the composite. As thermal strains are induced in the composite the expansion and contraction of the auxetic component and non-auxetic components remain in balance creating a composite material having non coefficient of expansion or a controlled rate of expansion in accordance with the proportion and distribution of the auxetic material within the composite.

Particular embodiments of the composite materials of the present invention may also exhibit one or more of the following advantages:

a) coefficients of thermal expansion equal in the longitudinal and transverse directions (i.e. parallel and perpendicular to the first direction);
b) where the composite materials of the present invention are in the form of laminates, a reduction in the number of layers of material required, relative to a laminate composite material containing no auxetic component, as a result of the removal of the directional dependency of thermal expansion behaviour in the laminate composite containing the auxetic component;
c) reduced levels of residual stresses relative to prior art composite materials;
d) removal of the need for separate balancing layers, conferring design advantages such as reduced design analysis, additional design options, improved composite performance and reduced composite mass;
e) reduced distortion during the cooling process; and
f) improved performance of joints between the composite materials of the present invention and surrounding materials having different rates of expansion, relative to such joints for materials lacking an auxetic component. The improvement is due to the ability to match the thermal expansion behaviour of the composite to the surrounding materials through addition of the auxetic component within the composite material or within an intermediate layer, such as a film adhesive, between the composite and surrounding materials.

A variety of auxetic materials have been reported, including auxetic thermoplastic (polyester urethane), thermosetting (silicone rubber) and metal (copper) foams (Friis, E. A., Lakes, R. S. & Park, J. B., *J. Mater. Sci.* 1988, 23, 4406); auxetic thermoplastic microporous polymeric cylinders (ultra high molecular weight polyethylene (UHMWPE); polypropylene (PP), and nylon) (Evans, K. E. & Ainsworth, K. L., International Patent Application WO 91/01210, 1991; Alderson, K. L. & Evans, K. E., *Polymer,* 1992, 33, 4435-8; Pickles, A. P., Alderson, K. L. & Evans, K. E., *Polymer Engineering and Science,* 1996, 36, 636-42; Alderson, K. L., Alderson, A., Webber, R. S. & Evans, K. E., *J. Mater. Sci. Lett.,* 1998, 17, 1415-19), monofilaments (PP, nylon and polyester) (Alderson, K. L., Alderson, A., Smart, G., Simkins, V. R. & Davies, P. J., *Plastics, Rubber and Composites* 2002, 31(8), 344; Ravirala, N., Alderson, A., Alderson, K. L. & Davies, P. J., *Phys. Stat. Sol. B* 2005, 242(3), 653) and films (PP) (Ravirala, N., Alderson, A., Alderson, K. L. & Davies, P. J., *Polymer Engineering and Science* 45(4) (2005) 517), naturally-occurring polymers (crystalline cellulose) (Peura, M., Grotkopp, I., Lemke, H., Vikkula, A., Laine, J., Müller, M. & Serimaa, R., *Biomacromolecules* 2006, 7(5), 1521 and Nakamura, K., Wada, M., Kuga, S. & Okano, T. *J Polym Sci B Polym Phys Ed* 2004; 42, 1206), composite laminates (carbon fibre-reinforced epoxy, glass fibre-reinforced epoxy and aramid-reinforced epoxy) (Alderson, K. L., Simkins, V. R., Coenen, V. L., Davies, P. J., Alderson, A. & Evans, K. E., *Phys. Stat. Sol. B* 242(3) (2005) 509), certain bismuth cuprate superconducting polycrystalline compounds (Dominec, J., Vasek, P., Svoboda, P., Plechacek, V. & Laermans, C., Modern Physics Letters B, 1992, 6, 1049-54), 69% of the cubic elemental metals (Baughman, R. H., Shacklette, J. M., Zakhidov, A. A. & Stafstrom, S., *Nature,* 1998, 392, 362-5), and naturally-occurring polymorphs of crystalline silica (α-cristobalite and α-quartz) (Yeganeh-Haeri, Y., Weidner, D. J. & Parise, J. B., *Science,* 1992, 257, 650-2; Keskar, N. R. & Chelikowsky, J. R., Phys. Rev. B 48, 16227 (1993)). Poisson's ratios as low as −12 have been measured in the auxetic polymers (Caddock, B. D. & Evans, K. E., *J. Phys. D: Appl. Phys.,* 1989, 22, 1877-82), indicating very large transverse strains (over an order of magnitude greater than the applied longitudinal strain) are possible.

Suitable fibres (reinforcement materials) in polymer composites are widely known within the field and may comprise continuous fibres, short chopped fibres, textile fabric structures and spherical inclusions made from glass, carbon, aramid, boron, silicon carbide and aluminium oxide. Any combination of the said fibres and forms may be used. Nanofibres and nanotubes may also form suitable fibres for use with the present invention. It is, of course, recognised that other alternative polymer, metal or ceramic materials to those identified above could be included as fibres, as would be readily apparent to the man skilled in the art.

The matrix material of the present invention may comprise one or more polymeric materials. The matrix material may comprise thermosetting polymers, thermoplastic polymers, or both thermosetting and thermoplastic polymers. Suitable thermosetting polymer examples are well known to those skilled in the art and include any of the following either alone or in combination: epoxy resins, unsaturated polyester resins, phenolic resins and polyimides. Suitable thermoplastic polymer examples are well known to those skilled in the art and include any of the following either alone or in combination: polypropylene, polyamide, polycarbonate, polyacetols, polyetheretherketone (PEEK), polyethylene terephtalate (PET), polyphenylene sulphide (PPS), polyethersulphone (PES) polyetherimide (PEI), and polybutylene terephthalate (PBT).

The matrix material may further comprise one or more additional components which may include any of the following either alone or in combination: curing agents, accelerators, pigments, softeners, flame retardants and toughening agents. The additional components may be organic (including polymeric), inorganic (including ceramic) or metallic in nature.

The additional components are added with the desired properties of the composite material in mind.

The auxetic component of the present invention may be incorporated into the fibres by way of auxetic monofilaments and multi-filaments and/or it may be incorporated into the matrix material.

Auxetic monofilaments and multi-filaments may be incorporated in the form of continuous fibres, short chopped fibres, or textile fabric structures.

The way in which the auxetic component is incorporated into the matrix material depends upon the nature of the desired composite material.

For example, finely divided auxetic materials may be added to the matrix in the form of a filler. Polycrystalline aggregates of α-cristobalite are suitable for incorporation into the matrix in this way. The auxetic filler may also be an alternative ceramic material, a polymer or a metal. Auxetic character may also be incorporated into a composite material through engineering the auxetic effect at the molecular level within the matrix itself. Examples of auxetic molecular-level materials include liquid crystalline polymers (He, C., Liu, P. & Griffin, A. C., *Macromolecules*, 31, 3145 (1998)), crystalline cellulose, cubic elemental metals, zeolites, α-cristobalite, and α-quartz.

Auxetic thermoplastic and/or thermosetting resins are known to the skilled man and would be suitable for use as the matrix material in the present invention.

Auxetic character may be imparted upon metal and ceramic based composites by way of auxetic metallic and ceramic materials.

Suitable fibres in Ceramic Matrix Composites are widely known within the field and may comprise continuous monofilament and multifilament tow fibres, whiskers, platelets and particulates of silicon carbide, silicon nitride, boron carbide, aluminium nitride, titanium diboride and boron nitride. Any combination of the said materials and forms may be used. The auxetic component of a Ceramic Matrix Composite may be incorporated into the fibres by way of monofilaments and multi-filaments, whiskers, platelets and particulates of auxetic ceramic. Known auxetic ceramics include the α-cristobalite and a-quartz polymorphs of silica, carbon nitride (Guo, Y. & Goddard III, W. A., *Chem. Phys. Lett.*, 1995, 237, 72), and certain bismuth cuprate compounds.

Matrix materials in Ceramic Matrix Composites are well known to those skilled in the art and include oxides such as alumina, silica, mullite, barium aluminosilicate, lithium aluminosilicate and calcium aluminosilicate. Non-oxide ceramic matrix materials include silicon carbide, silicon nitride, boron carbide, and aluminium nitride. The auxetic component of a Ceramic Matrix Composite may be incorporated into the matrix material as, for example, finely divided auxetic ceramic materials added to the matrix in the form of a filler. Alternatively, the ceramic matrix may be intrinsically auxetic.

Suitable fibres in Metal Matrix Composites are widely known within the field and may comprise continuous fibres, discontinuous fibres, whiskers, particulates and wires of tungsten, beryllium, titanium, molybdenum, boron, graphite (carbon), alumina, silicon carbide, boron carbide and alumina-silica.

Matrix materials in Metal Matrix Composites materials are well known to those skilled in the art and include aluminum, titanium, magnesium, iron and copper alloys and superalloys.

The auxetic component of a Metal Matrix Composite may be incorporated into the fibres by way of continuous fibres, discontinuous fibres, whiskers, particulates and wires of auxetic ceramic or metal material. The auxetic component of a Metal Matrix Composite may also be incorporated into the matrix material as, for example, finely divided auxetic ceramic or metal materials added to the matrix in the form of a filler. Alternatively, the metal matrix may be intrinsically auxetic. Known auxetic ceramics include the α-cristobalite and α-quartz polymorphs of silica, carbon nitride, and certain bismuth cuprate compounds. Known auxetic metals include arsenic, cadmium and 69% of the cubic elemental metals.

The present invention also provides a method for the preparation of a composite material described herein.

According to a second aspect of the present invention there is provided a method of making an uncured composite material of the first aspect comprising mixing: a layer of fibres, an uncured matrix, a first component which exhibits auxetic behaviour, and a second component which exhibits non-auxetic behaviour.

Preferably, where the auxetic material is anisotropic, the method according to the second aspect further includes forming the uncured composite comprising the auxetic material having a required orientation relative to the other components of the composite.

According to a third aspect of the present invention there is provided a method of making a composite material comprising forming an uncured composite material in accordance with the second aspect, and curing the uncured composite material.

The auxetic material used for the methods of the second and third aspect is selected for having the required properties and used in a required quantity. The uncured composite material of the second aspect is cured to obtain a cured composite material having the required thermal expansivities.

In a preferred embodiment, the matrix impregnates the layer of fibres during curing.

A typical method for the preparation of a curable composite material of the first aspect comprises:

a) laying out a 3-phase pre-preg reinforcing fibre-epoxy-auxetic material on a supporting table. The pre-preg consists of continuous unidirectional reinforcing fibres and continuous unidirectional auxetic fibres in a partially cured epoxy matrix.

b) cutting out and placing pieces of the pre-preg sheet in layers on top of each other on a tool of the required shape to form a laminate. The layers may be placed in different directions to optimise the properties of the composite.

c) placing the constructed laminate and tool in a vacuum bag, and applying a vacuum to remove entrapped air from the composite part.

d) placing the vacuum bag including the composite and tooling inside an autoclave for curing of the epoxy resin to take place. Curing conditions depend on the particular epoxy material employed. Typically the cure cycle lasts many hours during which the composite material is typically heated to a temperature in the range of 120 to 190° C. at a pressure of typically 350 to 700 kPa.

e) removing the vacuum bag including the composite and tooling from the autoclave, removing the composite and tooling from the vacuum bag, and removing the composite part from the tooling prior to further finishing operations.

Alternatively, another method for the preparation of a curable composite material comprises the following:

a) applying a gel coat to an open mould.

b) manually placing reinforcing fibre incorporating auxetic fibre in the mould. The reinforcing fibre and auxetic fibre may be in the form of a cloth or mat.

c) pouring, brusing, or spraying a resin, typically polyester, mixed with catalysts and accelerators over and into the reinforcing fibre-auxetic fibre plies.

d) using squeegees or rollers to wet the reinforcing fibres and auxetic fibres with the resin, and to remove entrapped air.

e) optionally adding additional reinforcing fibre-auxetic fibre plies and resin to increase the thickness of the part.

f) curing using room temperature curing resins, and initiating curing by a catalyst in the resin system, which hardens the composite without external heat.

Alternatively, there is provided a method for the preparation of a curable composite material in the form of a hollow cylinder comprising:
a) passing the reinforcing and auxetic fibres through a resin bath.
b) winding the resin-impregnated reinforcing and auxetic fibres on a rotating mandrel.
c) curing when sufficient layers have been applied the component at room temperature or at elevated temperature in an oven.
d) removing the moulded composite from the mandrel.

Alternatively, another method for the preparation of a curable composite material comprising:
a) laying out a 3-phase pre-preg reinforcing fibre-epoxy-auxetic material on a supporting table. The pre-preg consists of continuous unidirectional reinforcing fibres in a partially cured epoxy matrix containing auxetic filler particles.
b) cutting out and placing pieces of the pre-preg sheet in layers on top of each other on a tool of the required shape to form a laminate. The layers may be placed in different directions to optimise the properties of the composite.
c) placing the constructed laminate and tool in a vacuum bag, and applying a vacuum to remove entrapped air from the composite part.
d) placing the vacuum bag including the composite and tooling inside an autoclave for curing of the epoxy resin to take place. Curing conditions depend on the particular epoxy material employed. Typically the cure cycle lasts many hours during which the composite material is typically heated to a temperature in the range of 120 to 190° C. at a pressure of typically 350 to 700 kPa.
e) removing the vacuum bag including the composite and tooling from the autoclave, removing the composite and tooling from the vacuum bag, and removing the composite part from the tooling prior to further finishing operations.

Alternatively, another method for the preparation of a curable composite material comprises the following:
a) applying a gel coat to an open mould.
b) manually placing reinforcing fibre in the mould. The reinforcing fibre may be in the form of a cloth or mat.
c) mixing a resin, typically polyester, incorporating auxetic filler particles with catalysts and accelerators, and then pouring, brushing, or spraying over and into the reinforcing fibre plies.
d) using squeegees or rollers are used to wet the reinforcing fibres with the resin containing the auxetic filler, and to remove entrapped air.
e) optionally adding additional reinforcing fibre plies and auxetic filler-containing resin to increase the thickness of the part.
f) using room temperature curing resins, and initiating curing by a catalyst in the resin system, which hardens the composite without external heat.

Alternatively, there is provided a method for the preparation of a curable composite material in the form of a hollow cylinder comprising:
a) passing the reinforcing fibres through a resin bath containing auxetic filler particles within the resin.
b) winding the auxetic filler-containing resin-impregnated reinforcing fibres on a rotating mandrel.
c) curing either at room temperature or at elevated temperature in an oven when sufficient layers have been applied to the component.
d) removing the moulded composite from the mandrel.

It will be understood that the Poisson's ratio, Young's modulus, and coefficient of thermal expansion are determined at atmospheric pressure and room temperature (i.e. 20° C.), unless otherwise stated.

It is envisaged that the material of the present invention will find utility in the following applications:
a) Composite structures where a significant reduction of weight or increase in performance, such as load bearing capacity, is desirable and can be achieved by reduction of the internal stresses through the introduction of auxetic materials into the laminate. Applications include components for aircraft, road vehicles, off-road vehicles, military vehicles, precision machinery, boats, ships, and submarines.
b) Composites tools of improved performance, including for example: lower cost applications where expensive carbon fibre may be partially replaced by lower cost auxetic fibre or filler; improved precision and longer life due to thermal matching.
c) Composite structure, containing materials (matrix or reinforcement), which are thermally mismatched due to elevated temperature cures. The use of auxetic constituents enables reduced mass of the composite, reduced cost of design, improved design performance arising from increased design freedom, and reduced manufacturing costs and timescales.
d) Composites structures containing materials (matrix or reinforcement) which are thermally mismatched and operate over a considerable temperature range, including cryogenic applications. Cryogenic structures such as cryogenic fuel tanks and spacecraft components will benefit through reduced microcracking as a result of the reduction in residual stresses when incorporating an auxetic constituent within the composite.
e) Composite structures displaying enhanced stability for stability-critical applications such as optical instruments, RF instruments and measuring instruments. Improved stability arises through reduced microcracking, balanced lay-ups and reduced impact of manufacturing errors.
f) Composite structures requiring zero or low CTE behaviour, including casings for satellites to maintain size and shape from high temperature launch to low temperature space conditions; substrates for use in printed circuit boards; stable structures including optical benches; large telescope mirror substrates; laser gyroscopes in aircraft; fibre Bragg grating devices displaying constant reflected wavelength over a range of temperatures for use in optoelectronic systems.
g) Composite structures which require machining after moulding benefit from containing auxetic materials in the laminate. In the current state of the art the machining creates an imbalance in the laminate and may induce distortion in the part. This has particular applications for the machining of mould surfaces on composite tools.
h) Composite structures can be produced with fundamentally unbalanced laminates by the addition of auxetic materials to the laminate. This will have applications in parts which replace castings, or which can be made from unbalanced pre-forms produced by hand processes, knitting and/or weaving processes.
j) By adding auxetic materials in combination with localised unbalanced laminate configurations it is possible to produce local areas which have a different coefficient of thermal expansion to the component. This can be used to create areas suitable for the fitting of components which have a substantially different CTE, such as in metallic bearings.

k) Lower cost components can be made where substantial quantities of the expensive high performance reinforcement, such as carbon fibre, are replaced with a high proportion of lower cost auxetic fibre.

l) It is well known to those versed in the art that auxetic configurations have improved resistance to penetration. In addition, the reduced levels of internal stresses within the laminate resulting from the addition of auxetic materials will increase the impact resistance and energy absorbed during crushing. This has applications in the production of lightweight armour and vehicle crash structures.

m) Structures which distort in response to mechanical, thermal or electrical inputs, known as smart structures, are useful for producing products such as aircraft of superior performance. The addition of auxetic materials to a composite laminate used in a smart structure reduces the cost and complexity of the design since thermal balancing issues can be ignored, and enables the optimisation and adjustment of the laminate to respond to the mechanical, thermal or electrical input.

The present invention will now be described further, by way of example only, and with reference to the following drawings in which:

BRIEF DESCRIPTION OF THE DRAWING

FIG. 1 shows a composite laminate material 1 according to the prior art. The composite material 1 comprises two layers of carbon fibre reinforcement 2 and three layers of epoxy matrix component 3. The carbon fibre reinforcement layers 2 are arranged between the epoxy matrix component layers 3.

FIG. 2 shows a composite laminate material 4 of the present invention. The composite material 4 comprises carbon fibre reinforcement layers 5, and epoxy matrix component layers 6. The composite material also comprises an auxetic component layer 7 which is located between the carbon fibre reinforcement layers 5.

Figure 1:
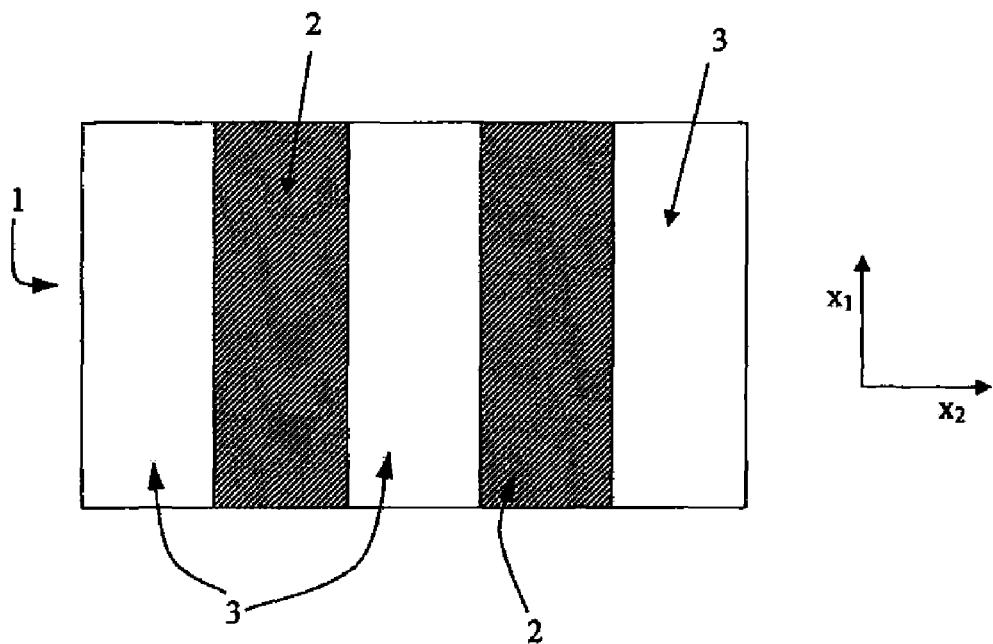
FIG. 1. shows a diagrammatic representation of a unidirectional composite laminate according to the prior art.
Figure 2:
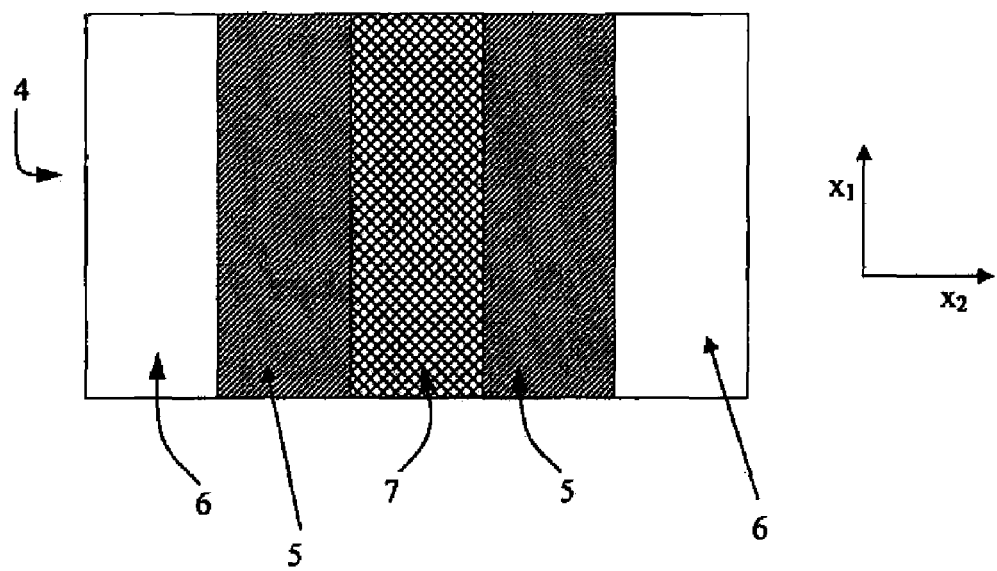
FIG. 2. shows a diagrammatic representation of a unidirectional composite laminate according to the present invention.

The following text further illustrates the present invention by comparing the anisotropic thermal expansion and residual stress behaviour for the prior art composite materials of the type shown in FIG. 1, and composite materials of the present invention of the type shown in FIG. 2.

Thermal Expansion Behaviour
Prior Art Composite Material.

If the reinforcing fibres 2 of the composite material 1 of FIG. 1 are assumed to be intimately bonded interfaces, then the thermal expansion coefficients along and transverse to the fibre layer 2 direction ($x_1$) are known to be reproduced well by the following equations (Kollar, L. P. & Springer, G. S., Mechanics of Composite Structures, Cambridge, pp. 443-444):

$$\alpha_1 = \frac{V_f E_{f1} \alpha_{f1} + V_m E_m \alpha_m}{V_f E_{f1} + V_m E_m} \quad (1)$$

$$\alpha_2 = V_f \alpha_{f2} + V_m \alpha_m + V_f \nu_{f12}(\alpha_{f1} - \alpha_1) + V_m \nu_m (\alpha_m - \alpha_1) \quad (2)$$

where:
- $\alpha_1$ and $\alpha_2$ are the coefficients of thermal expansion of the composite material 1 along and transverse to the fibre layer 2 direction, respectively,
- $V_f$ and $V_m$ are the fibre layer 2 and matrix 3 volume fractions, respectively,
- $E_{f1}$ and $E_m$ are the fibre layer 2 axial modulus and the matrix layer 3 Young's modulus, respectively,
- $\alpha_{f1}, \alpha_{f2}$ and $\alpha_m$ are the fibre 2 axial, fibre 2 radial and matrix 3 coefficients of thermal expansion, respectively, and
- $\nu_{f12}$ and $\nu_m$ are the fibre 2 axial and matrix 3 Poisson's ratios, respectively.

Using typical values of the parameters for carbon fibre as the fibre layers 2 and epoxy resin as the matrix 3 ($V_f$=0.62, $V_m$=0.38, $E_{f1}$=230 GPa, $E_m$=3 GPa, $\alpha_{f1}$=-6×10$^{-7}$K$^{-1}$, $\alpha_{f2}$=7×10$^{-6}$K$^{-1}$, $\alpha_m$=5.4×10$^{-5}$K$^{-1}$, $\nu_{f12}$=+0.2 and $\nu_m$=+0.38), equations (1) and (2) yield values for the coefficients of thermal expansion of the composite of $\alpha_1$=−1.67×10$^{-7}$K$^{-1}$ and $\alpha_2=3.26\times10^{-5}$ K$^{-1}$, clearly demonstrating the anisotropic nature of the thermal expansivity of the composite material 1 of FIG. 1.

Composite Material of the Present Invention.

The established analytical models as shown by equations (1) and (2) can be extended to include the presence of a third phase, and the coefficients of thermal expansion of the 3-phase composite material 4 of FIG. 2 are given by $$\alpha_1 = \frac{V_f E_{f1}\alpha_{f1} + V_m E_m \alpha_m + V_a E_a \alpha_a}{V_f E_{f1} + V_m E_m + V_a E_a} \quad (3)$$

$$\alpha_2 = V_f \alpha_{f2} + V_m \alpha_m + V_a \alpha_a + \\ V_f v_{f12}(\alpha_{f1} - \alpha_1) + V_m v_m(\alpha_m - \alpha_1) + V_a v_a(\alpha_a - \alpha_1) \quad (4)$$

where:
$V_a$ is the volume fraction of the third auxetic phase 7,
$E_a$ is the Young's modulus of the third auxetic phase 7,
$\alpha_a$ is the coefficient of thermal expansion of the third phase 7, and
$v_a$ is the Poisson's ratio of the third phase 7,
with the other symbols as already defined for equations (1) and (2).

Figure 3:
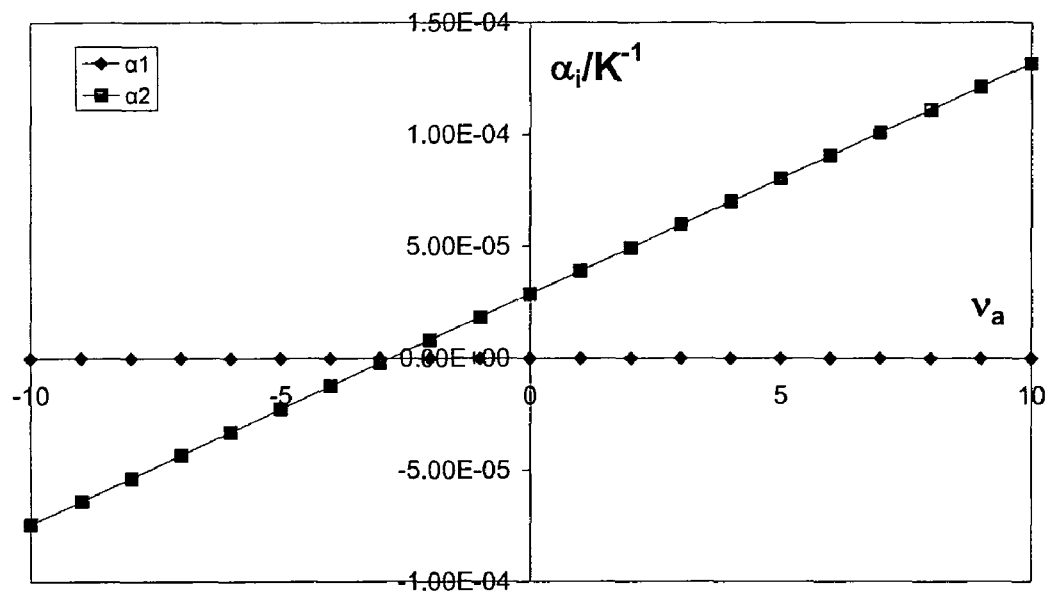
FIG. 3. shows a graph depicting coefficients of thermal expansion as a function of the Poisson's ratio of the third phase, for the laminate of FIG. 2.

One or more properties of the $3^{rd}$ auxetic phase 7 may be varied in order to achieve equal thermal expansivities along and transverse to the fibre layer 5 direction, including the possibility of (near) zero thermal expansion. For example, assuming all other properties of the $3^{rd}$ auxetic phase 7 are the same as the epoxy matrix 6 properties, and that the epoxy 6 and third auxetic phase 7 have equal volume fractions of 0.19 (i.e. the fibre layer 5 volume fraction is 0.62), then equal and near zero thermal expansivities are achieved along and transverse to the fibre layer 5 direction by choosing a $3^{rd}$ auxetic phase 7 having a Poisson's ratio near to −3. This is shown in FIG. 3 which shows the Poisson's ratio and coefficient of thermal expansion of the $3^{rd}$ auxetic phase 7 as a function of the volume fraction of the reinforcing fibre 5, where the volume fraction of the $3^{rd}$ auxetic phase is equal to 10% of the volume fraction of the non-auxetic matrix 6. Polymeric auxetic materials are known with Poisson's ratios as low as −12.

Where the coefficient of thermal expansion is zero, both along and transverse to the fibre 6 direction, the following relations hold for the coefficient of thermal expansion and Poisson's ratio of the third phase 7:

$$\alpha_a = -\left(\frac{V_f E_{f1}\alpha_{f1} + V_m E_m \alpha_m}{(1 - V_f - V_m)E_a}\right) \quad (5)$$

$$v_a = \frac{V_f\left[\alpha_{f2} + \alpha_{f1}\left(v_{f12} - \frac{E_{f1}}{E_a}\right)\right] + V_m \alpha_m\left(1 + v_m - \frac{E_m}{E_a}\right)}{V_f \frac{E_{f1}}{E_a}\alpha_{f1} + V_m \frac{E_m}{E_a}\alpha_m} \quad (6)$$

Equation (5) enables the relative amounts and properties of the non-auxetic reinforcement 5 and matrix phases 6 to be carefully selected to match the available coefficient of thermal expansion and Young's modulus of the third (auxetic) phase 7, and vice versa. Equation (6) provides for the selection of the appropriate sign and magnitude of Poisson's ratio for the third phase 7 based on the relative proportions and properties of the non-auxetic reinforcement 5 and matrix phases 6 and the Young's modulus of the third phase 7.

Figure 4:
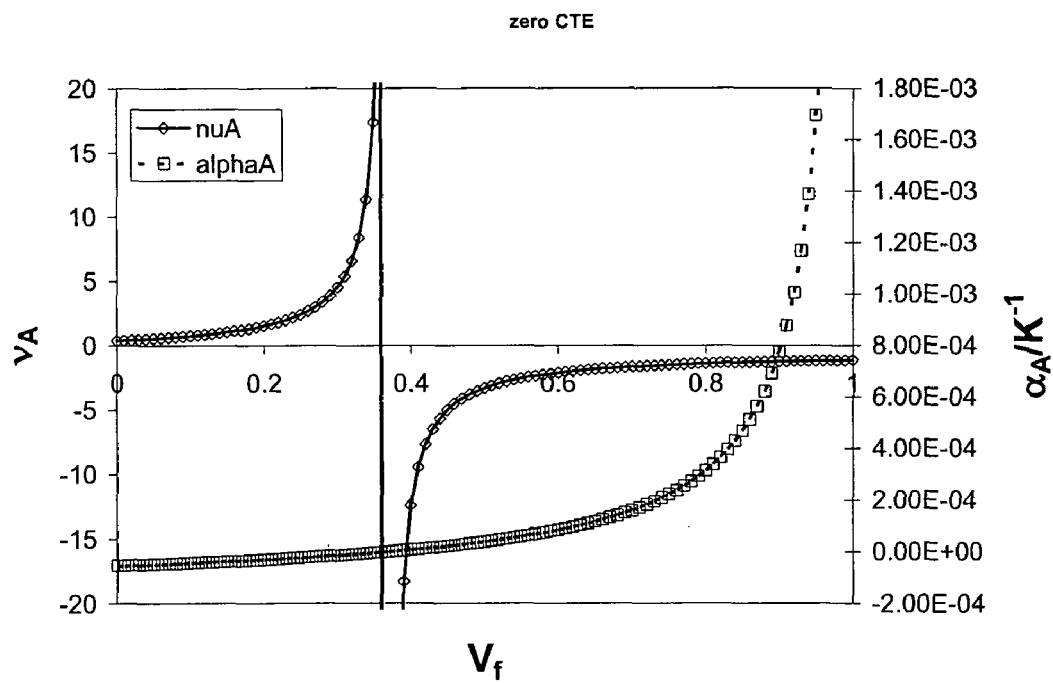
FIG. 4. shows a graph depicting the Poisson's ratio and coefficient of thermal expansion of the third phase as a function of volume fraction of the reinforcing fibre for the laminate of FIG. 2 with equal volume fractions for the non-auxetic matrix and $3^{rd}$ auxetic phase.

The coefficient of thermal expansion and Poisson's ratio of the third phase 7 are shown in FIG. 4 as a function of volume fraction of the reinforcing phase 5 for the proportions and properties of the constituents as defined above. For realistic reinforcing fibre 5 volume fractions in laminate composite systems 4 ($V_f=0.6$ to 0.7) the coefficient of thermal expansion of the third phase 7 is of the order of $1\times10^{-4}$ K$^{-1}$. The Poisson's ratio of the third phase 7 for $V_f$ in the range 0.6 to 0.7 is of the order of −2.

Figure 5:
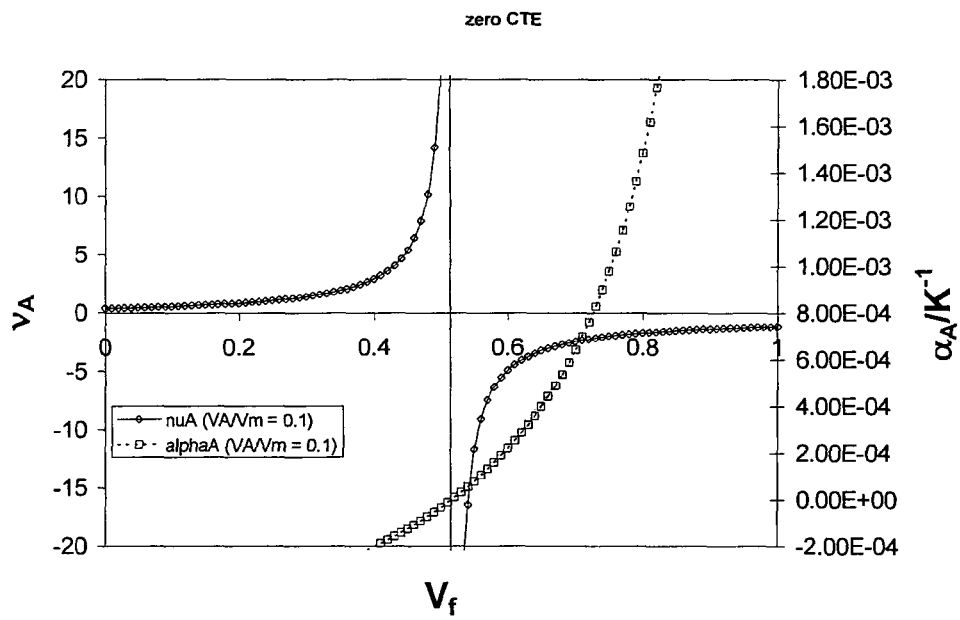
FIG. 5. shows a graph depicting the Poisson's ratio and coefficient of thermal expansion of the third phase as a function of volume fraction of the reinforcing fibre for the laminate of FIG. 2 with the volume fraction of the $3^{rd}$ auxetic phase equal to 10% of the volume fraction of the non-auxetic matrix.

Alternatively, it may be desirable to have a low volume fraction of the $3^{rd}$ auxetic phase 7. The coefficient of thermal expansion and Poisson's ratio of the third phase are shown in FIG. 5 as a function of volume fraction of the reinforcing phase 5 for the properties of the constituents as defined above, with the volume fraction of the $3^{rd}$ phase 7 equal to 10% of the volume fraction of the matrix phase 6. For realistic reinforcing fibre 5 volume fractions in laminate composite systems 4 ($V_f=0.6$ to 0.7) the coefficient of thermal expansion of the third phase 7 is of the order of $3\times10^4$ K$^{-1}$. The Poisson's ratio of the third phase 7 for $V_f$ in the range 0.6 to 0.7 is of the order of −4.

Auxetic polymers are known with Poisson's ratios in the range 0 to −12. A coefficient of thermal expansion in the range $1\times10^{-4}$ to $3\times10^4$ K$^{-1}$, for high and low auxetic fibre volume fractions respectively, is typical of many polymers and corresponds to the coefficient of expansion measured for auxetic polypropylene fibres of $2\times10^{-4}$ K$^{-1}$.

Figure 6:
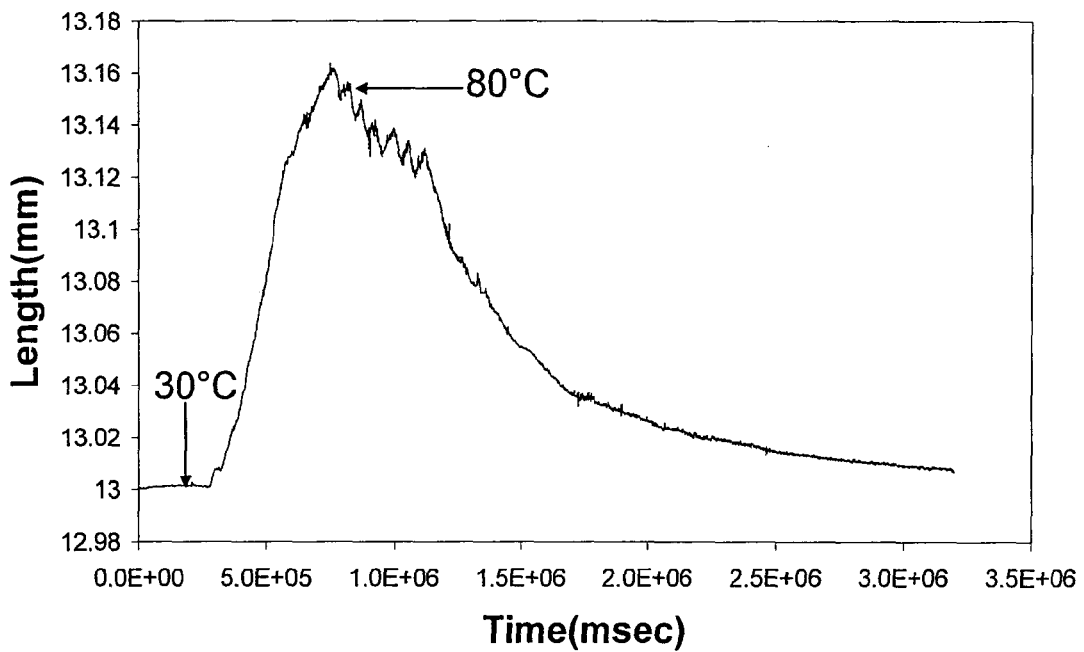
FIG. 6. shows a graph depicting the length as a function of time for an auxetic polypropylene fibre undergoing a heating cycle from 30° C. to 80° C. and back to 30° C.

FIG. 6 show a graph depicting the length as a function of time for an auxetic polypropylene fibre undergoing a heating cycle from 30° C. to 80° C. and back to 30° C. At 80° C. the fibre undergoes an extension of 0.14 mm from an initial length of 13 mm at 30° C. This corresponds to a strain of 0.01 over a 50° C. (50 K) temperature increase, yielding a coefficient of thermal expansion of $2\times10^{-4}$ K$^{-1}$ for the fibre.

Figure 7:
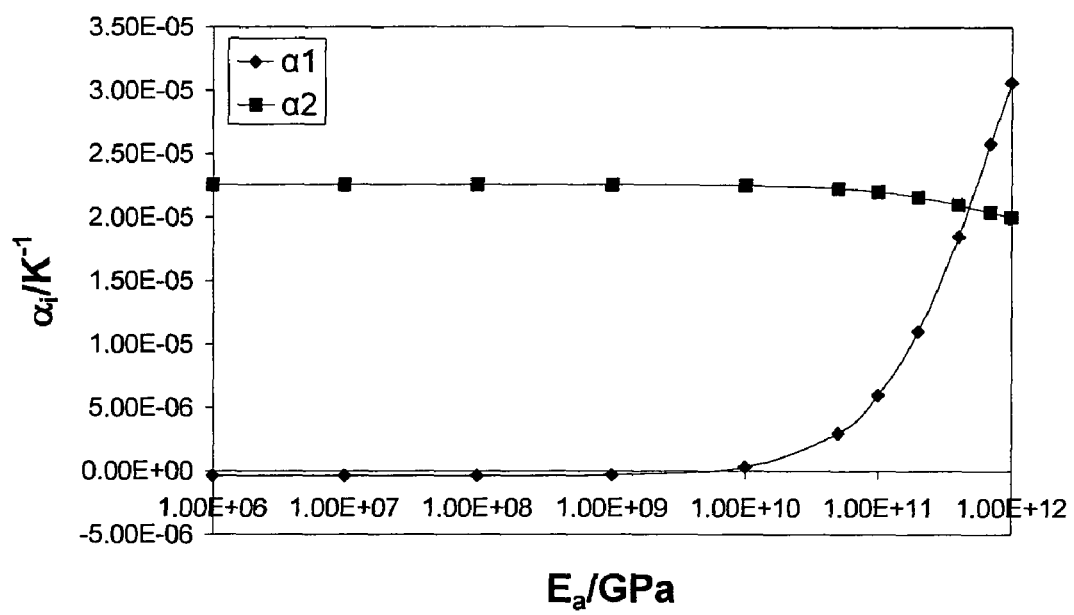
FIG. 7. shows a graph depicting coefficients of thermal expansion as a function of the Young's modulus of the third phase for the laminate of FIG. 2.

Alternatively, for a $3^{rd}$ auxetic phase 7 possessing a Poisson's ratio of $v_a=-0.6$ (typical of the auxetic polymeric fibres reported in the literature), with all other parameters except Young's modulus as above, and having equal $3^{rd}$ phase 7 and matrix 6 volume fractions, equal (but non-zero) thermal coefficients of expansion are realised for the composite material 4 when the Young's modulus of the $3^{rd}$ auxetic phase 7 is of the order of the axial Young's modulus of the reinforcing (carbon) fibre 5. This is shown by FIG. 7 which is a graph of coefficients of thermal expansion as a function of the Young's modulus of the third phase 7 for the composite material 4 of FIG. 2.

Residual Stresses

The two-phase carbon-epoxy composite structure 1 shown schematically in FIG. 1 will typically be cured at elevated temperatures, and subsequently cooled to ambient temperatures. During cooling the matrix 3 and reinforcement 2 shrink at different rates. This gives rise to a thermally induced mechanical stress on each component.

For longitudinal expansion (i.e. along the fibre 2 direction), the carbon fibre 2 undergoes little thermal expansion or contraction upon cooling due to the near zero coefficient of thermal expansion of the fibre 2 in this direction. The epoxy 3, on the other hand, has a large positive coefficient of thermal expansion, and therefore contracts in length. However, whilst the interface between the epoxy 3 and carbon 2 is intact, then the higher modulus carbon fibre 2 constrains the lower modulus epoxy matrix 3 from contraction, and so the thermal loading is converted to a mechanical tensile stress on the matrix 3. A tensile stress along the fibre 2 direction tends to cause the epoxy 3 to contract transversely (due to the positive Poisson's ratio of epoxy), leading to a build up of residual stress at the fibre 2-matrix 3 interface and therefore a degradation of the mechanical properties of the composite material 1.

For a 3-phase composite material 4 shown schematically in FIG. 2, the conversion of thermal strain to mechanical stress on the constituents would tend to put both the epoxy 6 and auxetic 7 ($3^{rd}$ auxetic phase) under tensile stress in the fibre direction 5 as the composite 4 cools. The auxetic phase 7 will expand in the transverse direction as a result of the negative Poisson's ratio, opposing the tendency of the epoxy 6 to contract. This will give rise to a reduction in the residual stresses within the composite 4, and therefore reduce the degradation of the mechanical properties that would otherwise occur in the 2-phase composite 1 as shown in FIG. 1.

Similarly, during heating of a 3-phase composite 4, the matrix 6, auxetic 7, and reinforcement 5 phases expand at different rates. Again, the carbon fibre 5 undergoes little thermal expansion or contraction upon heating due to the near zero coefficient of thermal expansion of the fibre 5 in this direction. The epoxy 6 and auxetic 7 ($3^{rd}$) phases, on the other hand, have large positive coefficients of thermal expansion and so try to increase in length. However, the higher modulus carbon fibre 5 constrains the lower modulus epoxy matrix 6 and auxetic phase 7 from extension, and so the thermal loading is converted to a mechanical compressive stress on the matrix 6 and auxetic phases 7 in the fibre 5 direction. As a result, large compressive strains develop in the epoxy 6 and auxetic phases 7 along the fibre 5 direction, relative to the near zero axial strain in the carbon fibre 5 itself. A compressive stress along the fibre 5 direction causes the epoxy 6 to expand transversely (due to the positive Poisson's ratio of epoxy 6) and the auxetic phase 7 to contract in the transverse direction (as a result of the negative Poisson's ratio). Once again, there is a reduction in the residual stresses within the composite 4, and therefore a reduction in the degradation of the mechanical properties that would otherwise occur in a 2-phase composite 1 as shown in FIG. 1.

For the following finite element modelling FEM FIGS. 8-15, the key shown on the figures identifies areas of higher compressive strain or stress as those corresponding to the shading shown on the left side of the key. Areas of lower compressive (or in some cases tensile) strain or stress are shown by shading corresponding to that on the right side of the key.

Figure 8:
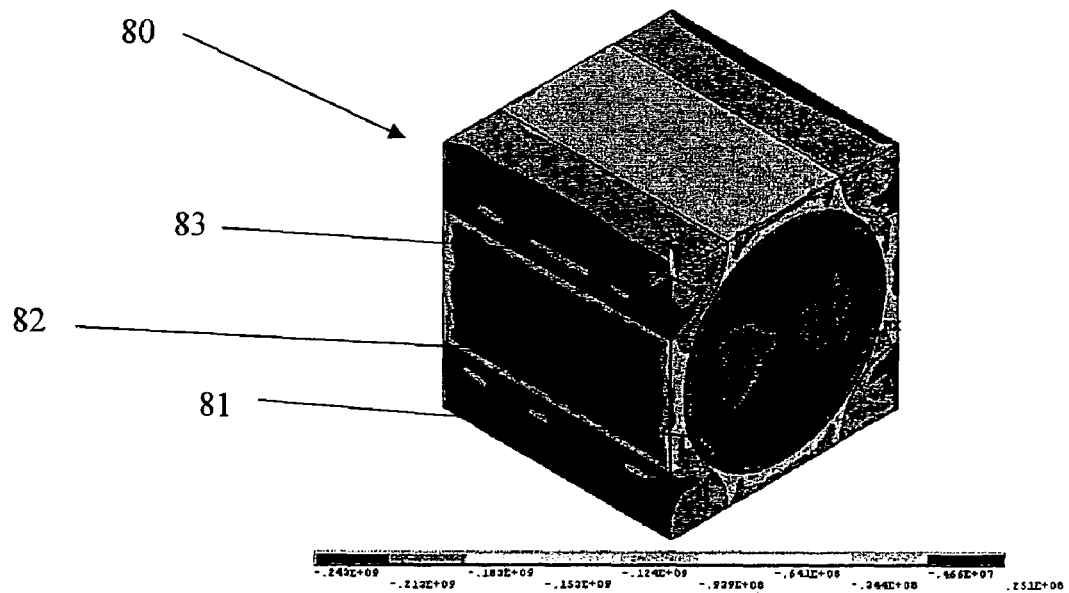
FIG. 8. shows a Finite Element Model (FEM) of a 3-phase composite comprising a central reinforcing fibrous phase surrounded by a matrix phase and a $3^{rd}$ (fibrous) phase located at each corner of the repeat unit.

FIG. 8 shows an FEM of a 3 phase composite material of the type shown in FIG. 2 undergoing heating from 0° C. to 120° C. FIG. 8 shows the 3-phase unit-cell 80 used in the FEM simulations, the unit-cell 80 comprising:
  a non-auxetic unidirectional reinforcing fibrous component 81 having a volume fraction of 0.62, an axial Poisson's ratio of +0.2, an axial Young's modulus of 230 GPa, an axial coefficient of thermal expansion of $-6 \times 10^{-7} K^{-1}$, and a transverse coefficient of thermal expansion of $7 \times 10^{-6} K^{-1}$;
  a non-auxetic matrix component 82 having a volume fraction of 0.19, an isotropic Poisson's ratio of +0.38, an isotropic Young's modulus of 3 GPa, an isotropic coefficient of thermal expansion of $5.4 \times 10^{-5} K^{-1}$; and
  a third phase unidirectional fibrous component 83 having a volume fraction of 0.19, an isotropic Young's modulus of 3 GPa, and an isotropic coefficient of thermal expansion of $5.4 \times 10^{-5} K^{-1}$.

Figure 9:
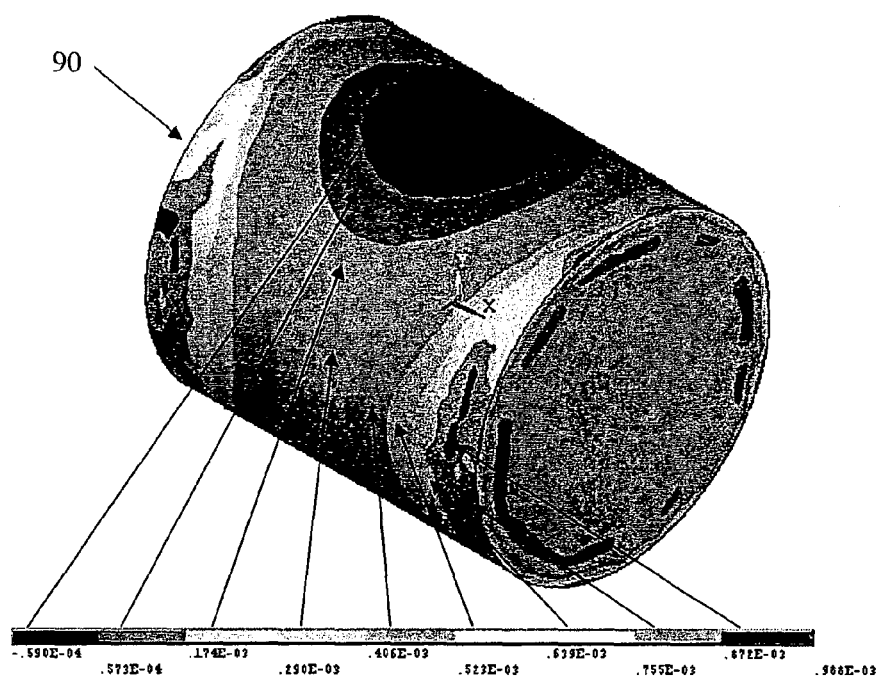
FIG. 9. shows a FEM model of axial strains acting on the reinforcing fibrous phase as a result of heating of the composite up to 120° C.
Figure 10:
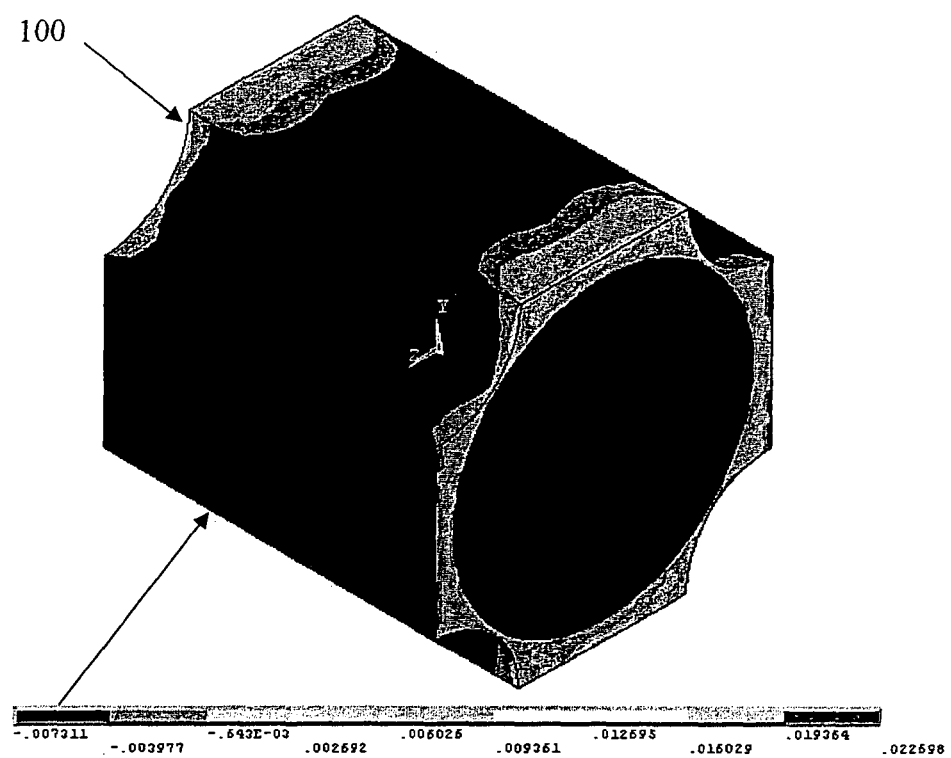
FIG. 10. shows a FEM model of axial strains acting on the non-auxetic matrix phase as a result of heating of the composite up to 120° C.
Figure 11:
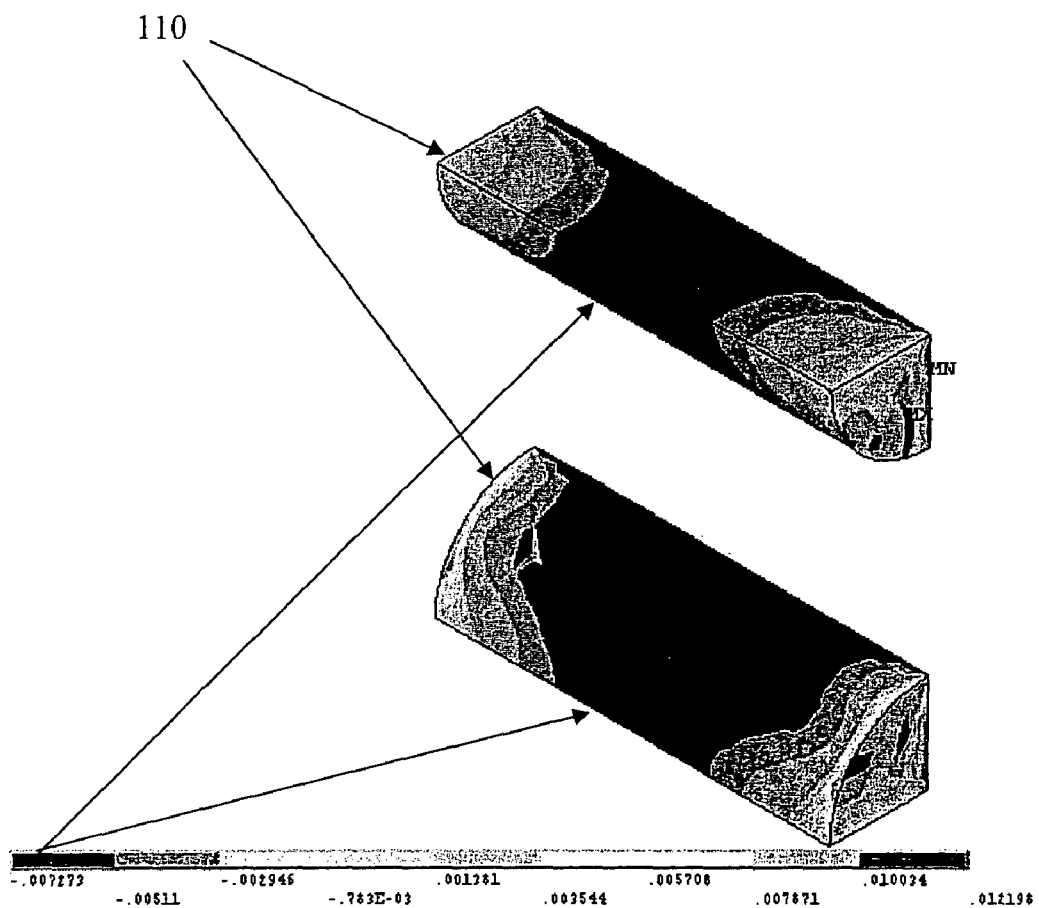
FIG. 11. shows a FEM model of axial strains acting on the $3^{rd}$ phase as a result of heating of the composite up to 120° C.

FIGS. 9, 10 and 11 show FEMs of the individual components making up a unit cell of the type shown in FIG. 8. FIG. 9 shows an FEM of a reinforcing fibre 90. FIG. 10 shows an FEM of the matrix 100, and FIG. 11 shows an FEM of the $3^{rd}$ auxetic phase 110. The strains that develop upon heating to 120° C. along the axial (fibre) direction in the reinforcing fibre 90, non-auxetic matrix 100 and the third phase 110, clearly showing compressive strains developing in the matrix 100 and third phase constituents 110, and that these strains are approximately 2 orders of magnitude larger than those that develop in the reinforcing fibre phase 90.

Figure 12:
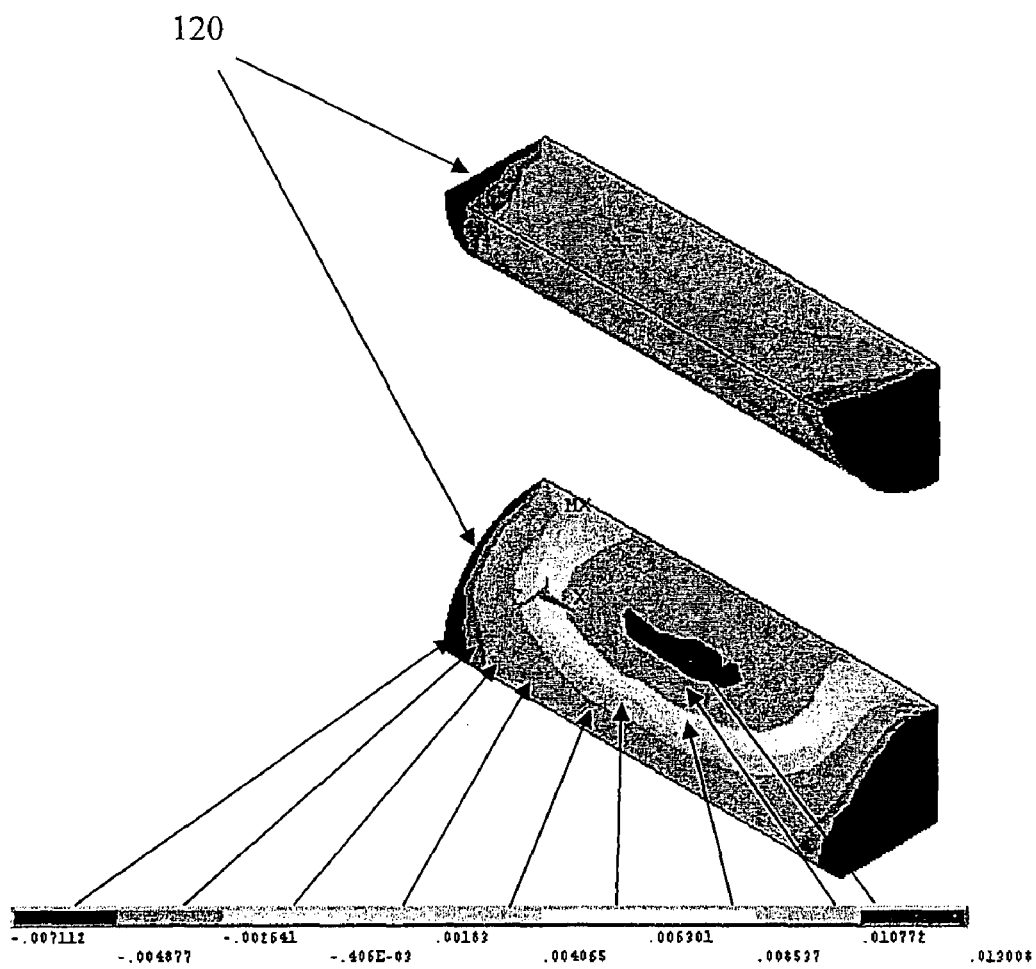
FIG. 12. shows a FEM model of transverse (z direction) strains acting on a non-auxetic $3^{rd}$ phase as a result of heating of the composite up to 120° C.
Figure 13:
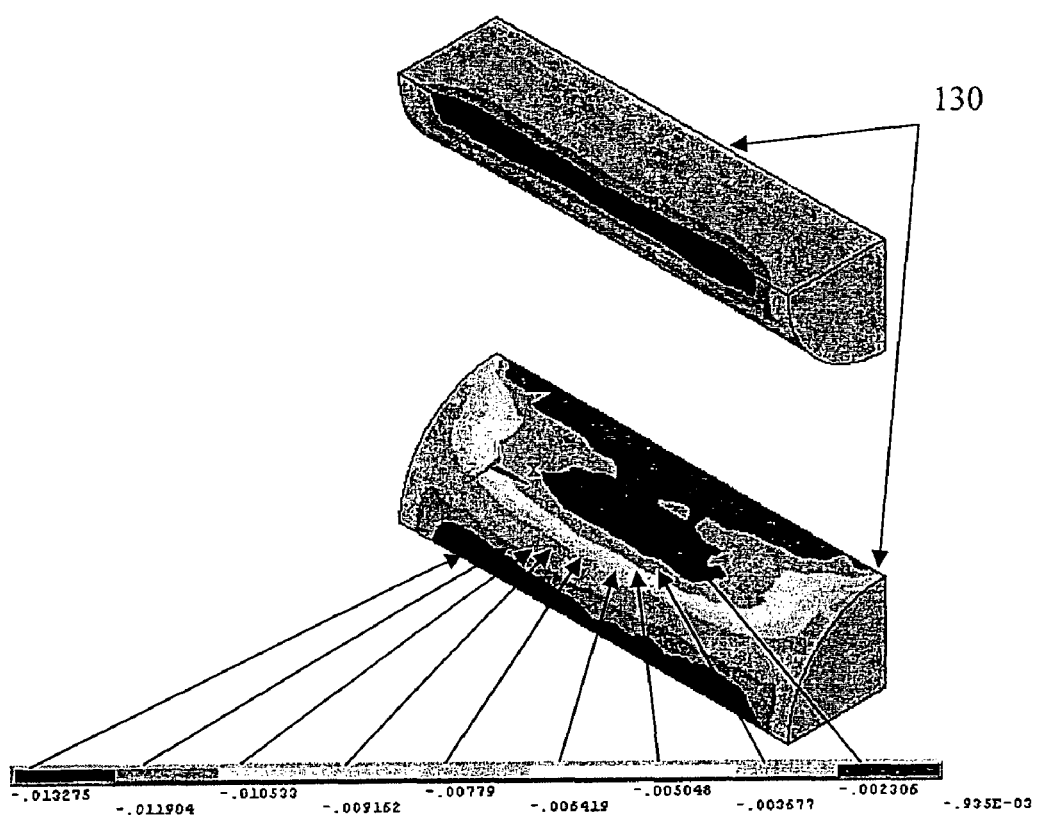
FIG. 13. shows a FEM model of transverse (z direction) strains acting on an auxetic $3^{rd}$ phase as a result of heating of the composite up to 120° C.

FIGS. 12 and 13 show FEMs of transverse strains acting on a non-auxetic $3^{rd}$ phase 120 and 130 due to heating a composite material up to 120° C. The strains that develop in the transverse z direction perpendicular to the axial direction for the $3^{rd}$ phases 120 and 130 have a Poisson's ratio of +0.38 (i.e. same as the non-auxetic matrix phase) and -0.6 (i.e. auxetic), respectively.

FIGS. 12 and 13 clearly show the transverse deformation of the $3^{rd}$ phase 120 and 130 depend on the sign of the Poisson's ratio of the material, undergoing transverse expansion and contraction for non-auxetic and auxetic constituents respectively, as a result of the axial compression which builds up on heating when compared to FIG. 11.

Figure 14:
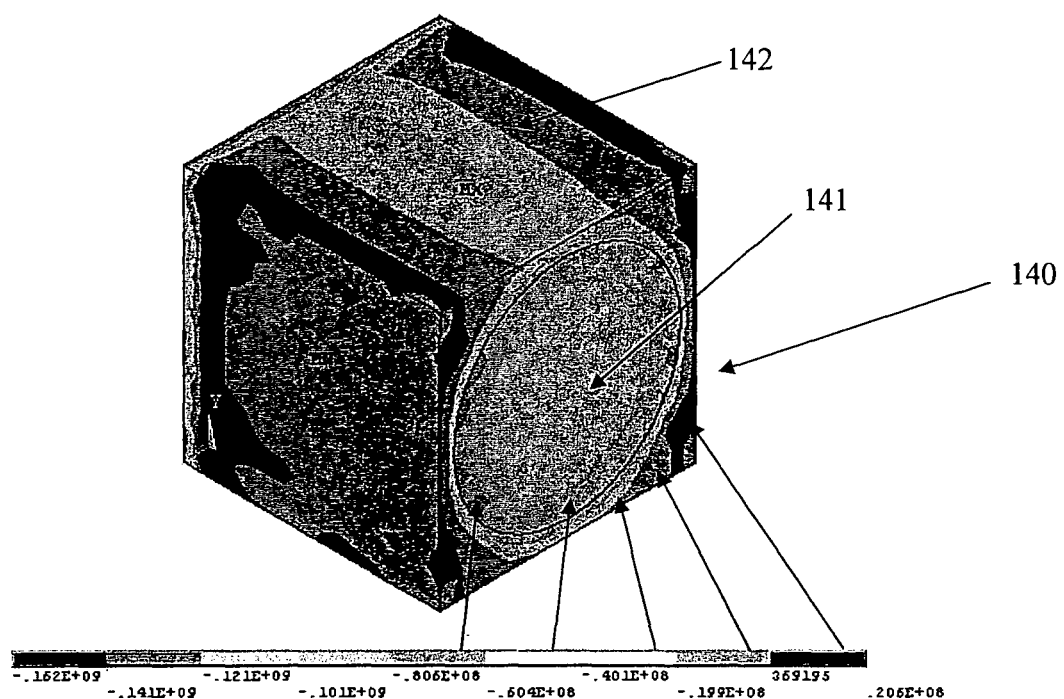
FIG. 14. shows a FEM model of transverse (z direction) stresses acting on a 2-phase composite (comprising a central reinforcing fibrous phase surrounded by a non-auxetic matrix) as a result of heating of the composite up to 150° C.
Figure 15:
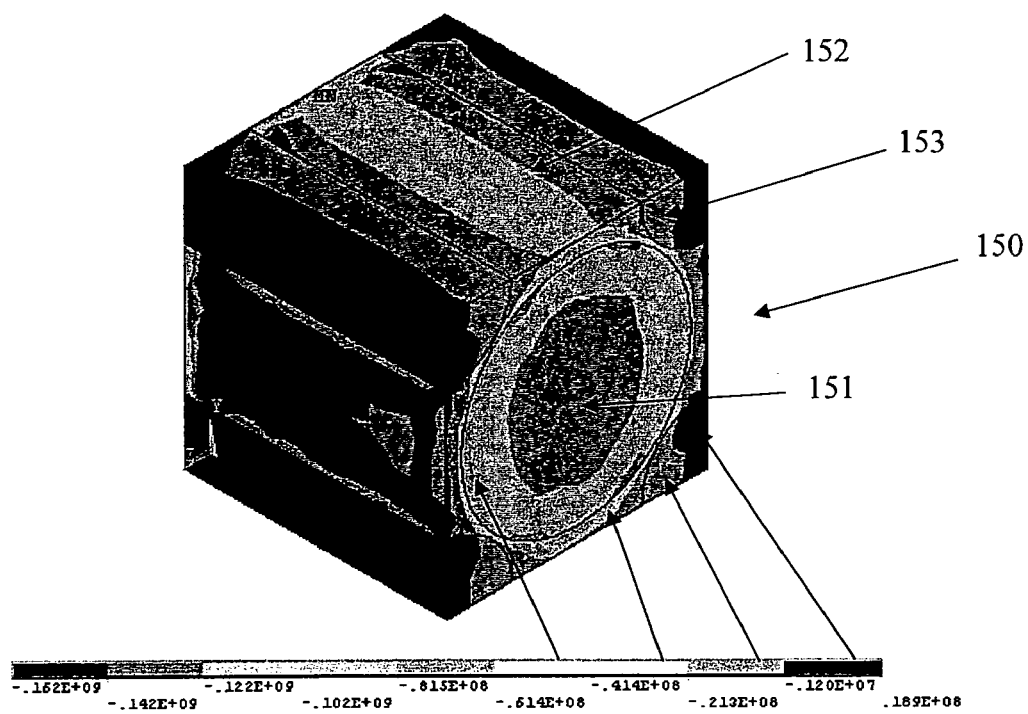
FIG. 15. shows a FEM model of transverse (z direction) stresses acting on a 3-phase composite (comprising a central reinforcing fibrous phase surrounded by a non-auxetic matrix with an auxetic $3^{rd}$ phase) as a result of heating of the composite up to 150° C.

FIGS. 14 and 15 show the transverse (z direction) stresses which develop within a 2-phase 140 and 3-phase 150 composite system upon heating to 150° C.

The 2-phase composite 140 used for FIG. 14 is of the type shown in FIG. 1 and, comprises:
  a non-auxetic unidirectional reinforcing fibrous component 141 having a volume fraction of 0.62, an axial Poisson's ratio of +0.2, an axial Young's modulus of 230 GPa, an axial coefficient of thermal expansion of $-6 \times 10^{-7} K^{-1}$, and a transverse coefficient of thermal expansion of $7 \times 10^{-6} K^{-1}$; and
  a non-auxetic matrix component 142 having a volume fraction of 0.38, an isotropic Poisson's ratio of +0.38, an isotropic Young's modulus of 3 GPa, and an isotropic coefficient of thermal expansion of $5.4 \times 10^{-5} K^{-1}$.

The 3-phase composite 150 used for FIG. 15 is of the type shown in FIG. 2, and comprises:
  a non-auxetic unidirectional reinforcing fibrous component 151 having a volume fraction of 0.62, an axial Poisson's ratio of +0.2, an axial Young's modulus of 230 GPa, an axial coefficient of thermal expansion of $-6 \times 10^{-7} K^{-1}$, and a transverse coefficient of thermal expansion of $7 \times 10^{-6} K^{-1}$;
  a non-auxetic matrix component 152 having a volume fraction of 0.19, an isotropic Poisson's ratio of +0.38, an isotropic Young's modulus of 3 GPa, an isotropic coefficient of thermal expansion of $5.4 \times 10^{-5} K^{-1}$; and
  an auxetic unidirectional fibrous component 153 having a volume fraction of 0.19, an isotropic Poisson's ratio of -0.6, an isotropic Young's modulus of 0.3 GPa, and an isotropic coefficient of thermal expansion of $8.5 \times 10^{-5} K^{-1}$.

FIGS. 14 and 15 clearly show a reduction of the residual compressive stresses is achieved in the 3-phase composite 150 when compared to the 2-phase composite 140. This is due to the presence of the $3^{rd}$ auxetic phase 153.

An example of the enhancement due to an auxetic phase in a multi-component composite of the type shown in FIG. 2 undergoing a directly applied mechanical load has been demonstrated in tests where a single auxetic fibre embedded in epoxy resin was found to require twice the force and three times the energy to extract the fibre from the epoxy in comparison to the equivalent non-auxetic fibre of the type shown in FIG. 1. In the current invention, the effect is achieved not by a directly applied mechanical load, but through conversion of thermal strain to mechanical stress during cooling and/or heating of the composite.

METHOD OF MAKING THE COMPOSITE MATERIAL

Example 1

A composite system of the type shown in FIG. 2 was prepared comprising auxetic polypropylene fibre embedded within a softened cold-cure epoxy matrix. The auxetic fibres were produced using melt extrusion of grade PB0580 polypropylene powder produced by Plast-Labor S.A. and supplied by Univar plc. The cold-cure epoxy resin used was Araldite LY 5052 with hardener HY 5084. Dibutyl phthalate was added to the resin as an inhibitor to cross-linking during the curing process, thus enabling careful control of the degree of cross-linking in the final produced composite system of the type shown in FIG. 2.

Example 2

A composite system of the type shown in FIG. 2 was prepared comprising auxetic polypropylene fibre and glass reinforcing fibre embedded within a cold-cure epoxy matrix. The auxetic fibres were produced using melt extrusion of grade PB0580 polypropylene powder produced by Plast-Labor S.A. and supplied by Univar plc. The glass fibre was provided by PPM Glass. The cold-cure epoxy resin was Araldite LY 5052 with hardener HY 5052 supplied by Huntsman of the type shown in FIG. 2.

It is of course to be understood that the invention is not intended to be restricted to the details of the above embodiments which are described by way of example only.

The invention claimed is:

1. A composite material comprising a layer of fibres conjoined to a matrix, wherein one of the matrix and fibres comprises a first component which exhibits auxetic behaviour for loading along a first direction, and the other of the matrix and fibres comprises a second component which exhibits non-auxetic behaviour for loading along the first direction, wherein
the first component and second component are selected such that the composite displays a predetermined coefficient of thermal expansion parallel and perpendicular to the first direction.

2. A composite material according to claim 1, wherein the layer of fibres comprises the first component and the matrix comprises the second component.

3. A composite material according to claim 1, wherein the layer of fibres comprises the second component, and the matrix comprises the first component.

4. A composite material according to claim 1, wherein the layer of fibres is embedded in the matrix.

5. A composite material according to claim 1, wherein the layer of fibres is partially embedded in the matrix.

6. A composite material according to claim 1, wherein the layer of fibres forms a separate layer in contact with the matrix.

7. A composite material according to claim 1, wherein the layer of fibres comprises unidirectional fibres.

8. A composite material according to claim 1, wherein the layer of fibres are a woven knit.

9. A composite material according to claim 1, wherein the layer of fibres comprises a non-woven mesh.

10. A composite material according to claim 1, wherein the layer of fibres comprises unidirectional fibres, and wherein the first direction, along which loading is applied for the assessment of auxetic behaviour, is parallel to the direction of the fibres.

11. A composite material according to claim 1, wherein the coefficients of thermal expansion of the composite material, measured parallel and perpendicular to the first direction, are substantially equal.

12. A composite material according to claim 1, wherein the volume fraction of the second component is between 60 and 70%.

13. A composite material according to claim 1, wherein the volume fraction of the first component is less than 40%.

14. A composite material according to claim 1, wherein the composite material additionally comprises a matrix material which exhibits non-auxetic behaviour for loading along the first direction.

15. A composite material according to claim 14, wherein the volume fraction of the non-auxetic matrix material is less than 40%.

16. A composite material according to any preceding claim, wherein the auxetic material is selected from a group consisting of auxetic thermoplastic (polyester urethane), thermosetting (silicone rubber) and metal (copper) foams, auxetic thermoplastic microporous polymeric cylinders (ultra high molecular weight polyethylene (UHMWPE), polypropylene (PP), and nylon), monofilaments (PP, nylon and polyester) and films (PP), naturally-occurring polymers (crystalline cellulose), composite laminates (carbon fibre-reinforced epoxy, glass fibre-reinforced epoxy and aramid-reinforced epoxy), and naturally-occurring polymorphs of crystalline silica ($\alpha$-cristobalite and $\alpha$-quartz).

17. A composite material according to claim 1, wherein, the matrix material comprises one or more polymeric materials, selected from a group consisting of thermosetting polymers, thermoplastic polymers, and both thermosetting and thermoplastic polymers.

18. A composite material according to claim 1, wherein the matrix material further comprises one or more additional components including any of the following either alone or in combination: curing agent, accelerator, pigment, softener, flame retardant and toughening agent.

19. A composite material according to claim 1, wherein the matrix is uncured and conjoined to the layer of fibers by a curing process.

20. A composite material according to claim 19, wherein the matrix impregnates the layer of fibres during curing.

21. A method of making a composite material comprising conjoining a layer of fibres to a matrix, wherein one of the matrix and fibres comprises a first component which exhibits auxetic behaviour for loading along a first direction, and the other of the matrix and fibres comprises a second component which exhibits non-auxetic behaviour for loading along the first direction and wherein the first component and second component are selected such that the composite displays a predetermined coefficient of thermal expansion parallel and perpendicular to the first direction.

* * * * *